US008435678B2

(12) United States Patent
Wixom et al.

(10) Patent No.: US 8,435,678 B2
(45) Date of Patent: *May 7, 2013

(54) ELECTRODE MATERIAL WITH ENHANCED IONIC TRANSPORT PROPERTIES

(75) Inventors: Michael Wixom, Ann Arbor, MI (US); Chuanjing Xu, Ann Arbor, MI (US)

(73) Assignee: A123 Systems, LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,938

(22) Filed: Apr. 18, 2012

(65) Prior Publication Data

US 2012/0199784 A1     Aug. 9, 2012

Related U.S. Application Data

(60) Division of application No. 12/955,091, filed on Nov. 29, 2010, now Pat. No. 8,187,753, which is a continuation of application No. 11/345,962, filed on Feb. 2, 2006, now Pat. No. 7,842, 420.

(60) Provisional application No. 60/649,501, filed on Feb. 3, 2005.

(51) Int. Cl.
    *H01M 4/13*     (2010.01)

(52) U.S. Cl.
    USPC ............... 429/231.95; 429/221; 429/231.5

(58) Field of Classification Search ............ 429/231.95, 429/231.5, 221
    See application file for complete search history.

(56) References Cited

U.S. PATENT DOCUMENTS

| 4,048,395 A | 9/1977 | Lai |
| 4,245,016 A | 1/1981 | Rampel |
| 4,668,596 A | 5/1987 | Shacklette et al. |
| 4,889,777 A | 12/1989 | Akuto |
| 4,950,566 A | 8/1990 | Huggins et al. |
| 5,187,209 A | 2/1993 | Hirai et al. |
| 5,213,895 A | 5/1993 | Hirai et al. |
| 5,436,093 A | 7/1995 | Huang et al. |

(Continued)

FOREIGN PATENT DOCUMENTS

| CA | 2200998 A1 | 9/1998 |
| CA | 2270771 A1 | 10/2000 |

(Continued)

OTHER PUBLICATIONS

Aleshin, A.N. et al., "Transport Properties of Poly (3,4-Ethylenedioxythiophene)/Poly (Styrenesulfonate)," Synthetic Metals 94:173-177 (1998).

(Continued)

*Primary Examiner* — Jane Rhee
(74) *Attorney, Agent, or Firm* — Wilmer Cutler Pickering Hale and Dorr LLP

(57) ABSTRACT

Materials useful as electrodes for lithium batteries have very good electronic and ionic conductivities. They are fabricated from a starting mixture which includes a metal, a phosphate ion, and an additive which enhances the transport of lithium ions in the resultant material. The mixture is heated in a reducing environment to produce the material. The additive may comprise a pentavalent metal or a carbon. In certain embodiments the material is a two-phase material. Also disclosed are electrodes which incorporate the materials and lithium batteries which incorporate those electrodes.

19 Claims, 1 Drawing Sheet

U.S. PATENT DOCUMENTS

| | | | |
|---|---|---|---|
| 5,538,814 A | 7/1996 | Kamauchi et al. |
| 5,576,121 A | 11/1996 | Yamada et al. |
| 5,614,334 A | 3/1997 | Kamauchi et al. |
| 5,624,605 A | 4/1997 | Cao et al. |
| 5,670,277 A | 9/1997 | Barker et al. |
| 5,677,080 A | 10/1997 | Chen |
| 5,695,893 A | 12/1997 | Arai et al. |
| 5,705,296 A | 1/1998 | Kamauchi et al. |
| 5,714,053 A | 2/1998 | Howard |
| 5,733,683 A | 3/1998 | Searson et al. |
| 5,759,714 A | 6/1998 | Matsufuji et al. |
| 5,789,100 A | 8/1998 | Burroughs et al. |
| 5,834,136 A | 11/1998 | Gao et al. |
| 5,871,866 A | 2/1999 | Barker et al. |
| 5,897,522 A | 4/1999 | Nitzan |
| 5,902,689 A | 5/1999 | Vleggaar et al. |
| 5,910,382 A | 6/1999 | Goodenough et al. |
| 5,925,283 A | 7/1999 | Taniuchi et al. |
| 6,085,015 A | 7/2000 | Armand et al. |
| RE36,843 E | 8/2000 | Lake et al. |
| 6,096,454 A | 8/2000 | Tran et al. |
| 6,103,419 A | 8/2000 | Saidi et al. |
| 6,120,940 A | 9/2000 | Poehler et al. |
| 6,136,472 A | 10/2000 | Barker et al. |
| 6,136,476 A | 10/2000 | Schutts et al. |
| 6,153,333 A | 11/2000 | Barker |
| 6,156,931 A | 12/2000 | Lewis |
| 6,174,623 B1 | 1/2001 | Shackle |
| 6,203,946 B1 | 3/2001 | Barker et al. |
| 6,231,779 B1 | 5/2001 | Chiang et al. |
| 6,300,016 B1 | 10/2001 | Jan et al. |
| 6,306,540 B1 | 10/2001 | Hiroi et al. |
| 6,319,632 B1 | 11/2001 | Amine |
| 6,322,929 B1 | 11/2001 | Takada et al. |
| 6,337,156 B1 | 1/2002 | Narang et al. |
| 6,387,568 B1 | 5/2002 | Barker et al. |
| 6,391,493 B1 | 5/2002 | Goodenough et al. |
| 6,447,951 B1 | 9/2002 | Barker et al. |
| 6,514,640 B1 | 2/2003 | Armand et al. |
| 6,528,003 B1 | 3/2003 | Sano et al. |
| 6,528,033 B1 | 3/2003 | Barker et al. |
| 6,596,435 B2 | 7/2003 | Kelley |
| 6,599,662 B1 | 7/2003 | Chiang et al. |
| 6,656,635 B2 | 12/2003 | Okawa et al. |
| 6,702,961 B2 | 3/2004 | Barker |
| 6,716,372 B2 | 4/2004 | Barker |
| 6,720,113 B2 | 4/2004 | Goto et al. |
| 6,723,470 B2 | 4/2004 | Barker et al. |
| 6,730,281 B2 | 5/2004 | Barker |
| 6,787,232 B1 | 9/2004 | Chiang et al. |
| 6,815,122 B2 | 11/2004 | Barker et al. |
| 6,855,273 B2 | 2/2005 | Ravet et al. |
| 6,884,544 B2 | 4/2005 | Barker et al. |
| 7,001,690 B2 | 2/2006 | Barker et al. |
| 7,008,726 B2 | 3/2006 | Adamson et al. |
| 7,026,071 B2 | 4/2006 | Mayes et al. |
| 7,026,072 B2 | 4/2006 | Barker et al. |
| 7,060,206 B2 | 6/2006 | Barker et al. |
| 7,090,785 B2 | 8/2006 | Chiang et al. |
| 7,276,218 B2 | 10/2007 | Barker et al. |
| 7,282,301 B2 | 10/2007 | Wixom et al. |
| 7,438,992 B2 | 10/2008 | Barker et al. |
| 7,718,317 B2 | 5/2010 | Adamson et al. |
| 7,767,332 B2 | 8/2010 | Barker et al. |
| 7,842,420 B2 | 11/2010 | Wixom et al. |
| 8,148,013 B2 | 4/2012 | Chiang et al. |
| 8,187,753 B2 | 5/2012 | Wixom et al. |
| 2001/0005558 A1 | 6/2001 | Yoshioka et al. |
| 2001/0005562 A1 | 6/2001 | Yoshioka et al. |
| 2001/0007726 A1 | 7/2001 | Yoshioka et al. |
| 2001/0021472 A1 | 9/2001 | Barker et al. |
| 2001/0055718 A1 | 12/2001 | Li et al. |
| 2002/0004169 A1 | 1/2002 | Yamada et al. |
| 2002/0015278 A1 | 2/2002 | Fukuyama et al. |
| 2002/0036282 A1 | 3/2002 | Chiang et al. |
| 2002/0039687 A1 | 4/2002 | Barker et al. |
| 2002/0041998 A1 | 4/2002 | Hosoya |
| 2002/0047112 A1 | 4/2002 | Hosoya |
| 2002/0048706 A1 | 4/2002 | Mayes et al. |
| 2002/0056719 A1 | 5/2002 | Morin et al. |
| 2002/0061274 A1 | 5/2002 | Hosoya |
| 2002/0071990 A1 | 6/2002 | Kweon et al. |
| 2002/0071991 A1 | 6/2002 | Kweon et al. |
| 2002/0074972 A1 | 6/2002 | Narang et al. |
| 2002/0086214 A1 | 7/2002 | Barker |
| 2002/0094481 A1 | 7/2002 | Goto et al. |
| 2002/0102459 A1 | 8/2002 | Hosoya et al. |
| 2002/0106562 A1 | 8/2002 | Sato et al. |
| 2002/0106563 A1 | 8/2002 | Okawa et al. |
| 2002/0106564 A1 | 8/2002 | Okawa et al. |
| 2002/0110736 A1 | 8/2002 | Kweon et al. |
| 2002/0114754 A1 | 8/2002 | Hosoya |
| 2002/0122984 A1 | 9/2002 | Sakai et al. |
| 2002/0124386 A1 | 9/2002 | Hosoya |
| 2002/0150816 A1 | 10/2002 | Sakai et al. |
| 2002/0168573 A1 | 11/2002 | Baker et al. |
| 2002/0182497 A1 | 12/2002 | Kohzaki et al. |
| 2002/0192137 A1 | 12/2002 | Chaloner-Gill et al. |
| 2002/0192148 A1 | 12/2002 | Kweon et al. |
| 2002/0192553 A1 | 12/2002 | Barker et al. |
| 2002/0195591 A1 | 12/2002 | Ravet et al. |
| 2003/0003352 A1 | 1/2003 | Kweon et al. |
| 2003/0013019 A1 | 1/2003 | Barker et al. |
| 2003/0027049 A1 | 2/2003 | Barker et al. |
| 2003/0049529 A1 | 3/2003 | Cho et al. |
| 2003/0054250 A1 | 3/2003 | Kweon et al. |
| 2003/0064287 A1 | 4/2003 | Masquelier et al. |
| 2003/0064290 A1 | 4/2003 | Li |
| 2003/0077514 A1 | 4/2003 | Barker et al. |
| 2003/0082446 A1 | 5/2003 | Chiang et al. |
| 2003/0082454 A1 | 5/2003 | Armand et al. |
| 2003/0087155 A1 | 5/2003 | Cho et al. |
| 2003/0099884 A1 | 5/2003 | Chiang et al. |
| 2003/0124423 A1 | 7/2003 | Sasaki et al. |
| 2003/0129492 A1 | 7/2003 | Barker et al. |
| 2003/0143465 A1 | 7/2003 | Takahashi et al. |
| 2003/0170534 A1 | 9/2003 | Kim et al. |
| 2003/0170542 A1 | 9/2003 | Barker et al. |
| 2004/0005265 A1 | 1/2004 | Chiang et al. |
| 2004/0018430 A1 | 1/2004 | Holman et al. |
| 2004/0033360 A1 | 2/2004 | Armand et al. |
| 2004/0086445 A1 | 5/2004 | Armand et al. |
| 2004/0175614 A1* | 9/2004 | Wurm et al. ............... 429/221 |
| 2004/0214084 A1 | 10/2004 | Barker et al. |
| 2005/0186476 A1 | 8/2005 | Barker et al. |
| 2006/0127767 A1 | 6/2006 | Gauthier et al. |
| 2008/0138709 A1 | 6/2008 | Hatta et al. |

FOREIGN PATENT DOCUMENTS

| | | |
|---|---|---|
| CA | 2307119 C | 7/2009 |
| EP | 0 421 421 B1 | 1/1995 |
| EP | 1231651 A1 | 8/2002 |
| EP | 1231653 A1 | 8/2002 |
| EP | 0 933 827 B1 | 5/2003 |
| JP | 04-58455 | 2/1992 |
| JP | 07101728 | 4/1995 |
| JP | 8287914 A | 11/1996 |
| JP | 09022693 | 1/1997 |
| JP | 9035717 A | 2/1997 |
| JP | 2003292309 A | 10/2003 |
| JP | 2004359538 A | 12/2004 |
| WO | WO-97/40541 A1 | 10/1997 |
| WO | WO-98/16960 | 4/1998 |
| WO | WO-99/56331 | 11/1999 |
| WO | WO-00/41256 | 7/2000 |
| WO | WO-01/53198 A1 | 7/2001 |
| WO | WO-01/54212 A1 | 7/2001 |
| WO | WO-01/77501 | 10/2001 |
| WO | WO-02/27823 A1 | 4/2002 |
| WO | WO-02/27824 A1 | 4/2002 |
| WO | WO-02/43168 | 5/2002 |
| WO | WO-03/012908 | 2/2003 |
| WO | WO-03/056646 | 7/2003 |

OTHER PUBLICATIONS

Arbizzani et al., "$Li_{1.03}Mn_{1.97}O_4$ Surface Modification by Poly (3,4-Ethylenedioxithiophene)," Poster presented at 11.sup.th Intl. Meeting on Lithium Batteries, Jun. 23-28, 2002, Monterey, CA. 20 pages.

Armand, M.B. et al., "Poly-Ethers as Solid Electrolytes," Proceedings of the Intl. Conference on Fast Ion Transport in Solids, Electrodes and Electrolytes, Lake Geneva, WI, 131-136 (1979).

Chen, Z., et al., "Reducing Carbon in LiFePO.sub.4/C Composite Electrodes to Maximize Specific Energy, Volumetric Energy, and Tap Density", Journal of the Electrochemical Society, 149(9) (2002) A1184-A1189.

Chiang, Y. et al., "High Capacity, Temperature-Stable Lithium Aluminum Manganese Oxide Cathodes for Rechargeable Batteries," Electrochem. and Solid-State Lett. 2(3):107-110 (1999).

Delacourt et al., "The existence of a temperature-driven solid solution in LixFePO4 for 0</=x</=1," Nature Materials, Mar. 2005, vol. 4, pp. 254-260.

Elliott, S.R., "Physics of Amorphous Materials," Longman Group Limited. 200 pages.

Franger et al. "LiFePO.sub.4 Synthesis Routes for Enhanced Electrochemical Performance" Electrochem. Solid-State Lett., 5 A231-233 (2002).

French, R.H. et al., "Full Spectral Calculation of Non-Retarded Hamaker Constants for Ceramic Systems from Interband Transition Strengths," Solid State Ionics 75:13-33 (1995).

French, R.H. et al., "Origins and Applications of London Dispersion Forces and Hamaker Constants in Ceramics," J. Am. Ceram. Soc. 83(9):2117-2146 (2000).

Gaubicher, et al., "Li/.beta.-VOPO.sub.4:A New 4 V System for Lithium Batteries," J. Electrochem Soc. 146(12):4375-4379 (1999).

Ghosh, S. et al., "Supramolecular Self-Assembly for Enhanced Conductivity in Conjugated Polymer Blends: Ionic Crosslinking in Blends of Poly(3,4,-Ethylenedioxythiophene)-Poly(Styrenesulfonate) and Poly(vinylpyrrolidone)," Adv. Mater. 10(14):1097-1099(1998).

Gray, F.M., "Solid Polymer Electrolytes,"VCH Publishers Inc. (1991). 130 pages.

Huang, et al., "Approaching Theoretical Capacity of LiFePO.sub.4 at Room Temperature at High Rates," Electrochem. Sol. St. Lett. 4(10):A170-172 (2001).

Idota, Y. et al., "Tin-Based Amorphous Oxide: A High-Capacity Lithium-Ion-Storage Material," Science 276:1395-1397 (1997).

International Search Report, from PCT/US02/41471, mailed Apr. 11, 2003. 9 pages.

Kuwabata, S. et al., "Charge-Discharge Properties of Composites of LiMn.sub.2O.sub.4 and Polypyrole as Positive Electrode Materials for 4 V Class of Rechargeable Li Batteries," Electrochimica Acta 44:4593-4600 (1999).

Limthongkul, P. et al., "Nanocomposite Li-Ion Battery Anodes Produced by the Partial Reduction of Mixed Oxides," Chem. Mater. 13:2397-2402 (2001).

Milling, A. et al., "Direct Measurement of Repulsive Van Der Waals Interactions Using an Atomic Force Microscope," J. Colloid & Interface Science 180:460-465 (1996).

Neumann et al., "Negative Hamaker Coefficients," Colloid and Polymer Science 257(4):414-419(1979).

Ohzuku, T. et al., "Synthesis and Characterization of LiAl.sub.1/4Ni.sub.3/4O.sub.2 (R3m) for Lithium-Ion (Shuttlecock) Batteries," J. Electrochem. Soc. 142(12):4033-4039(1995).

Padhi, A.K. et al., "Phospho-olivines as Positive-Electrode Materials for Rechargeable Lithium Batteries," J. Electrochem. Soc., 1997, 144, 1188-1194.

Prosini "Improved electrochemical performance of a LiFePO.sub.4-based composite cathode," Electrochim. Acta, 46: 3517-3523 (2001).

Prosini "Synthesis and Characterization of Amorphous Hydrated FePO.sub.4 and Its Electrode Performance in Lithium Batteries," J. Electrochem. Soc., 149(3): A297-301 (2002).

Prosini A New Synthetic Route for Preparing LiFePO.sub.4 with Enhanced Electrochemical Performance, J. Electrochem. Soc., 149(7): A886-890 (2002).

Ravet, et al., "Improved Iron Based Cathode Material," Abstr. No. 127, ECS Fall Meeting, Hawaii (1999). 1 page.

Ravet, N. et al., "Electroactivity of natural and synthetic triphylite," Journal of Power Sources, 2001, 97-98, 503-507.

Song, et al. "Temperature-dependent properties of FePO.sub.4 cathode materials," Material Research Bulletin 37(7): 1249-1257 (2002).

Striebel et al,, "Comparison of LiFePO4 from Different Sources", Journal of the Electrochemical Society, 152(4) A664-A670 (2005).

Tarascon, et al., "Issues and Challenges Facing Rechargeable Lithium Batteries," Nature 414:359-367 (2001).

Van Oss, C.J. et al., "Applications of Net Repulsive Van Der Waals Forces Between Different Particles, Macromolecules or Biological Cells in Liquids," Colloids and Surfaces 1:45-56 (1980).

Van Oss, C.J. et al., "Comparison Between Antigen-Antibody Binding Energies and Interfacial Free Energies," Immunological Communications 6(4):341-354 (1977).

Van Oss, C.J. et al., "Repulsive Van Der Waals Forces. I. Complete Dissociation of Antigen-Antibody Complexes by Means of Negative Van Der Waals Forces," Immunological Communications 8(1):11-29 (1979).

Van Oss, C.J. et al., "Repulsive Van Der Waals Forces. II Mechanism of Hydrophobic Chromatography," Separation Science and Technology 14(4):305-317 (1979).

Wang et al., "Improving the rate performance of LiFePO4 by Fe-site doping", Electrochimica Acta. vol. 50, No. 14, pp. 2955-2958, May 5, 2005.

Wang, C. et al., "All Solid-State Li/Li.sub.xMnO.sub.2 Polymer Battery Using Ceramic Modified Polymer Electrolytes," J. Electrochemical Soc. 149(8):A967-972 (2002).

Yamada, A. et al., "Optimized LiFePO.sub.4 for Lithium Battery Cathodes," J. Electrochem. Soc., 2001, 148, A224-A229.

Yamada, et al., "Crystal Chemistry of the Olivine-Type Li(Mn.sub.yFe.sub.1-y) PO.sub.4 and (Mn.sub.yFe.sub.1-y)PO.sub.4 as Possible 4 V Cathode Materials for Lithium Batteries," J. Electrochem. Soc. 148(8):A960-967 (2001).

Yonemura et al., "Comparative Kinetic Study of Olivine LixMPO4 (M=Fe, Mn)", Journal of Electrochemical Society 151 (9), A1352-A1356 (2004).

\* cited by examiner

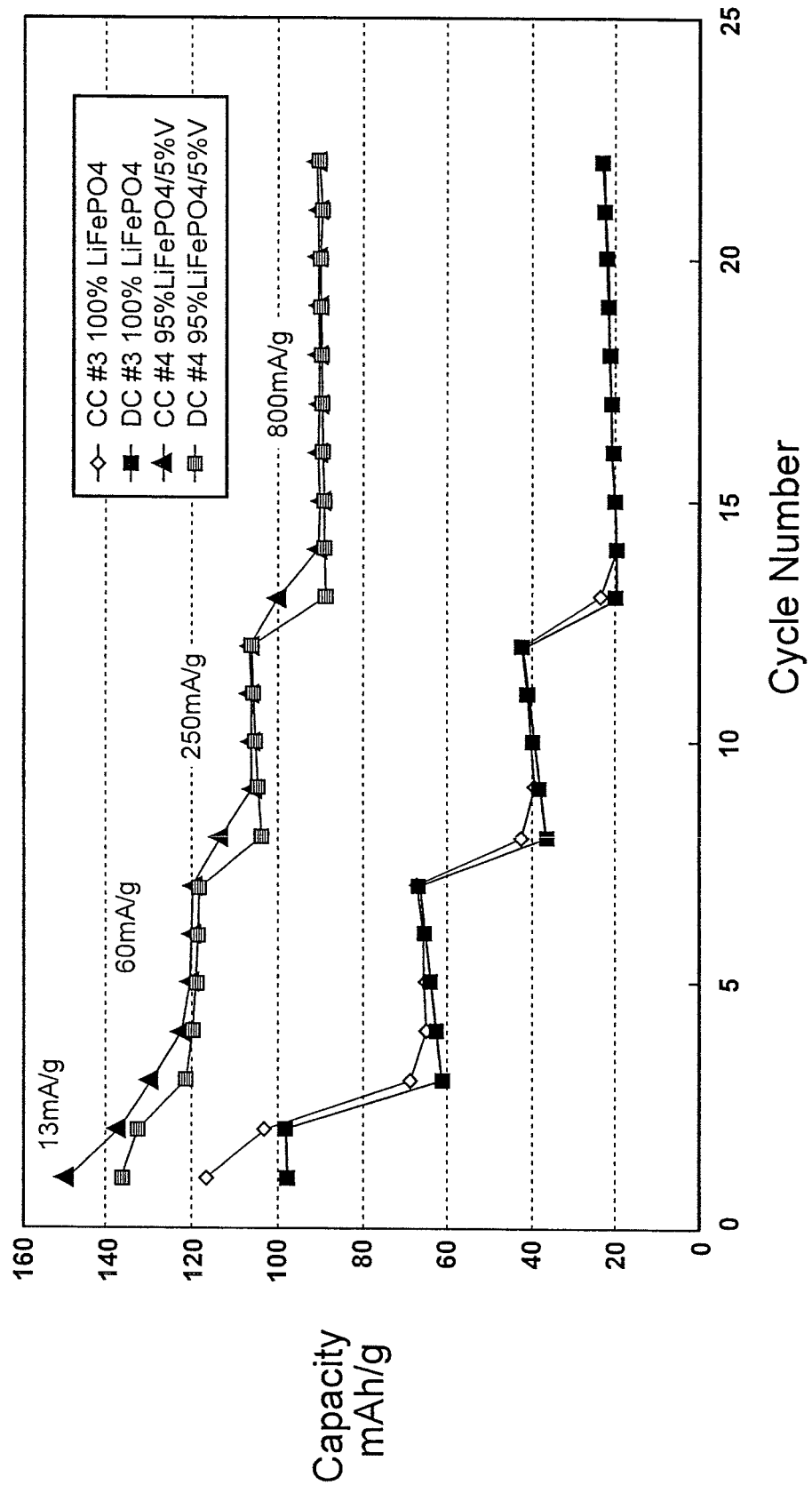

ELECTRODE MATERIAL WITH ENHANCED IONIC TRANSPORT PROPERTIES

RELATED APPLICATIONS

This application is a divisional of U.S. patent application Ser. No. 12/955,091 filed Nov. 29, 2010 entitled "Electrode Material With Enhanced Ionic Transport Properties", which claims priority to U.S. patent application Ser. No. 11/345,962 filed Feb. 2, 2006, which claimed priority to U.S. Provisional Application Ser. No. 60/649,501 filed Feb. 3, 2005.

FIELD OF THE INVENTION

This invention relates generally to materials and to methods for synthesizing these materials. More specifically, the invention relates to methods for synthesizing particular materials which include a metal phosphate phase. Most specifically, the invention relates to a method for synthesizing a metal phosphate material which has an enhanced conductivity for lithium ions, as well as to such materials, and to electrodes and other devices made from such materials.

BACKGROUND OF THE INVENTION

Lithiated transition metal phosphates such as $LiFePO_4$, including various doped and modified versions thereof, are finding growing utility as cathode materials for lithium batteries. In operation, these materials transport electrons and lithium ions there through. Lithium transport through such materials is a significant factor influencing their performance in lithium battery systems. Hence the efficiency of devices which incorporate such materials is dependent on their lithium ion transport properties among other things. For this reason, the art has sought to increase the lithium transport in such materials.

As will be explained herein below, the present invention provides an electronic material based upon lithiated metal phosphates which material combines good electronic conductivity with high ionic conductivity. In certain embodiments of the invention, the materials are composites of at least two phases. The materials of the present invention are simple and economical to synthesize, and are ideal cathodes for lithium batteries with high power capabilities.

BRIEF DESCRIPTION OF THE INVENTION

Disclosed herein is a method for synthesizing a material having utility as an electrode for a lithium battery. The method comprises providing a starting mixture which includes lithium, a metal, a phosphate ion and an additive which enhances the transport of lithium ions in a material prepared by this method, as compared to a material prepared in the absence of the additive. The mixture is heated in a reducing environment so as to produce a material which comprises $Li_xMPO_4$ wherein M is said metal, and x ranges from 1 upwards to approximately 1. In some specific instances x may have values as high as 1.05, it being understood that such superstoichiometric values are within the definition of "approximately 1" for purposes of this disclosure. In particular instances, the additive is selected from the group consisting of: V, Nb, Mo, C, and combinations thereof. In some instances, the additive promotes the reduction of the phosphate ion. In other instances, the additive promotes the reduction of a carbon-containing species so as to generate free carbon. In other instances, the additive substitutes for a portion of the metal in the material. In other instances, it may substitute for a portion of the phosphorus.

In yet other instances, the additive may function as a nucleating agent which promotes the growth of at least one component of the material. In still other instances, the additive may promote the reduction of a carbon-containing species in the starting mixture so as to generate free carbon, and this free carbon may be at least partially $sp^2$ bonded. In yet other instances, the additive is operative to modify the lattice structure of the material so that the transport of lithium ions through the modified lattice is enhanced in relation to the transport of lithium ions through a corresponding unmodified lattice.

In some instances, the material is a two-phase material which includes a first phase comprised of the $Li_xMPO_4$ and a second phase. The ionic conductivity of the second phase may be higher than that of the first phase. In specific instances, the second phase includes oxygen and the atomic ratio of oxygen to phosphorus is less than 4:1. In certain embodiments, the first phase comprises 80-95 mole percent of the composite material and the second comprises 5-20 mole percent.

In some instances the metal M is initially present in the starting mixture in a first oxidation state, and when the mixture is heated in a reducing environment at least a portion of the metal is reduced from the first oxidation state to a second oxidation state which is lower than the first oxidation state. In some instances, the reducing environment may comprise a gaseous reducing environment, which in other instances, the reducing environment may be provided by the inclusion of a solid or liquid reducing agent. Heating may be carried out in a temperature range of 300-750° C., and in particular instances, at a temperature in the range of 650-700° C.

Also disclosed herein are materials made by the process of the present invention. In one instance, the materials of the present invention are characterized in that when they are incorporated into a cathode of a lithium battery, the lithium ion conductivity of the material is in the range of $10^{-6}$ S/cm to $5 \times 10^{-4}$ S/cm. The material may be further characterized in that when incorporated into a cathode of a lithium ion battery, its electronic conductivity is in the range of $10^{-7}$ S/cm to $10^{-4}$ S/cm. Also disclosed herein are electrodes made from the materials of the present invention as well as lithium batteries which incorporate those electrodes.

BRIEF DESCRIPTION OF THE DRAWING

FIG. 1 is a graph showing the rate capability of materials of the present invention and comparative materials, in terms of capacity versus charge/discharge cycle numbers

DETAILED DESCRIPTION OF THE INVENTION

Prior art methods for synthesizing lithiated metal phosphate materials generally rely upon a chemical reaction of precursor materials which is typically carried out at elevated temperatures. In accord with the present invention, the inventors thereof have synthesized lithiated metal phosphate compounds by reacting precursor materials under reducing conditions, typically wherein the metal component thereof is reduced from a higher to a lower oxidation state; and in so doing, the inventors have found that the thus-produced material has significantly improved performance characteristics as a cathode material for lithium batteries, as compared to prior art materials. In particular instances, the metal and the phosphate are both present in one component of the starting mixture. For example, when the metal is iron, the starting mixture may include $FePO_4$, wherein the iron is present in the +3 state.

As the synthesis reaction proceeds, the iron is reduced to the +2 state. Materials produced by this process manifest good electronic and ionic conductivities and it is believed that this is in part attributable to the fact that the metal and the phosphate ion are initially in close proximity in the starting mixture. Having the iron and phosphorus in close proximity reduces processing time and temperature since less solid state diffusion is required.

According to the method of the present invention, the starting mixture includes an additive which enhances the lithium ion conductivity of the thus-produced material, as compared to materials prepared identically, but in the absence of the additive. The additive may comprise one or more metals having a +5 oxidation state. And, in particular instances, the metal does not have a +6 oxidation state. Vanadium is one specifically preferred additive metal; niobium is another. In some instances, carbon acts as an additive, and this carbon may be derived from a source, such as a polymer or other organic compound which is reduced during the preparation of the material. In particular instances one additive, such as the aforementioned metal, may enhance or cause the activity of another additive such as carbon. As will be detailed below, the additive may operate in various modes so as to enhance the ionic conductivity of the material; and in some instances, it may also act to enhance the electronic conductivity of the material.

Upon investigation, the inventors have found that in particular instances, the reductive, synthetic method of the present invention produces a two-phase material. This material was analyzed via electron microscopy and EDX, and it has been found that the thus-produced material includes a first phase which comprises a lithiated metal phosphate having very good ionic conductivity, and a second phase which has an electronic conductivity greater than that of the first phase. In some instances the second phase is a species that includes at least the metal and phosphorus, and may also include subphosphate levels of oxygen. In certain instances, the second phase also has good ionic conductivity. In a particular material, the first phase is of the general formula $Li_xMPO_4$ wherein M is a metal such as iron, and x is less than or equal to approximately 1; and a second phase which is the reduced form of a metal phosphate. For example, when the metal is iron, the second phase includes one or more of: $Fe_2P_2O_7$; FeP; $Fe_2P$ and $Fe_3P$.

As noted above, inclusion of relatively small amounts of an additive enhances the performance of the resulting cathode material, presumably by enhancing the lithium ion transport properties of the material. This effect may be manifest as an increase in the ionic conductivity of the bulk material, and/or as an enhancement of ion transport between particles of the bulk material. The additive may be incorporated as an additional component of the material as a dopant, modifier or the like, and in such instance, the general formula for the material given above is understood to also represent materials of the general formula $Li_xM_{1-y}A_yPO_4$ where A is the additive, y is less than 1, and M and x are as described above. In other instances, the additive may not be directly incorporated into the material, and may function as a catalyst or other species which modifies the physical and/or chemical environment of the material. Among the additives which may be so employed is vanadium, typically included in the starting mixture in the form of $V_2O_5$. Niobium and its compounds may be similarly employed. Other additives include: other metals, such as molybdenum, and carbon. The additive may directly influence the lithium ion conductivity of the material; or it may act as a flux which enhances the dispersion of lithium. The additive may also enhance formation of another species such as carbon, a metal, or the like, and this species can then function as an additive so as to enhance the performance of the resultant cathode material, either directly or by promoting the formation of a phase or species having high lithium capacity. For example, carbon may be generated by the reduction of organic molecules present in the reaction mixture, and this carbon can act as a direct conductivity enhancer and/or as an additive which enhances the material, and the additive may influence the amount and/or nature of the carbon. Also, the additive may function as a nucleating agent which fosters growth of a preferred phase or species. In other instances, the additive will facilitate the formation of surface states on particles of the material, which states facilitate inter-particle ion transport.

The additive may play various other roles in the material. It may function as a catalyst which promotes the reduction of phosphate or other species in the resultant material as discussed above. In other instances, the additive may function as a dopant. For example, an additive such as vanadium may substitute for some portion of the phosphorous in the material, and in that regard, it may enhance the ionic conductivity of the material. The additive may also substitute for some portion of the Fe in the olivine structure, and may thus enhance ionic transport in the material through effects such as vacancy hopping, modification of local electron density, formation of larger tunnels or the like. The additive may also act to modify the lattice structure of the material, either by doping or by steric and/or electronic effects; and this modified lattice can have an improved ionic conductivity. As such, the additive may have diverse and overlapping functions, and may act as a dopant and/or a catalyst for the formation of such beneficial structures. Therefore, the role of the additive in enhancing the lithium ion capacity and transport is to be interpreted broadly.

In accord with yet another aspect of the present invention, the methods hereof provide for the preparation of a material which includes carbon wherein the electronic state, morphology and/or disposition of the carbon in the material is optimized so as to provide a cathode material having enhanced electronic and ionic transport properties. Carbon is known to have good electrical conductivity; the presence of even relatively small amounts of carbon can enhance the electrical conductivity of materials of the type used in the practice of the present invention. It has been found that the electronic and lithium ion transport properties of $sp^2$ coordinated carbon are better with regard to the materials of the present invention than are the corresponding properties of $sp^3$ coordinated carbon. While not wishing to be bound by speculation, it is believed that use of the methods of the present invention provides a material having an increased concentration of $sp^2$ carbon, as compared to other processes in the prior art. For example, presence of the additive and/or the reduction step increases the amount of preferred $sp^2$ carbon and/or improves its distribution. As a result, higher ionic and electronic conductivities are achieved.

In addition, the methods of the present invention optimize the particle size, shape and/or distribution of the carbon so as to maximize its effect while minimizing any inhibition of ionic transport. The in situ generation of carbon from an intimately mixed mixture of reactive precursors facilitates the distribution of very small particles and/or thin films of carbon on or between particles of ionically active material. These small-dimensioned bodies of carbon establish good electrical contact between ionically active particles while minimizing any impediment to ion transport there between.

Therefore, in accord with this particular aspect of the present invention, it has been found that steps of the present invention including one or more of incorporation of an additive, milling and mixing, and reaction under reducing conditions serves to optimize the electronic and physical properties of carbon which may be included in the materials of the present invention. In this manner, both electronic conductivity and ionic storage and transport properties of the materials of the present invention are optimized with regard to their use as electrochemical materials, and in particular cathode materials for lithium batteries.

In one group of embodiments of the two-phase material of the present invention, the first phase comprises approximately 80-95 mole percent of the composite material and the second phase comprises 5-20 mole percent of the composite material. In a particular group of materials, the first phase comprises 85-90 mole percent of the material and the second phase comprises 10-15 mole percent of the material. Typical concentrations of the additive material in the resultant composite material are generally fairly low, and typically fall in the range of 0.1-5 atomic percent of the total material. EDX analysis suggests that concentrations of metals such as vanadium, or other residual additives are somewhat higher in or near the interface with the second phase which confirms that the additive material is active in the formation of the second phase. It is possible, also, that the additive can act as a nucleation point for the growth of the second phase.

In a typical process for the synthesis of a material of the present invention, a starting mixture which includes lithium, a metal such as iron, a source of phosphate ion and the additive is prepared. This mixture is typically blended by grinding such as in a ball mill, attritor mill, mortar or the like, and this resultant mixture is heated in a reducing environment. In some instances the grinding process may introduce organic compounds into the reaction mixture, as for example from solvents or from the vessel in which milling takes place. Carbon derived from this source can have a beneficial effect on the formation of the material of the present invention. In other instances carbon-containing compounds may be specifically introduced into the mixture prior to reaction. One such carbon source is polyvinyl alcohol (PVA). A typical reducing environment may comprise a gaseous atmosphere including one or more of hydrogen, ammonia, hydrocarbons and carbon monoxide; and in general, equal results are obtained utilizing either gas. In other instances, the reducing environment may be created by including solid or liquid reductants in the mixture.

In one group of syntheses, the source of lithium is a lithium salt such as lithium carbonate. The iron and phosphate ions may both be provided by utilizing a material such as ferric phosphate, which is subsequently reduced to a ferrous compound. As noted above, vanadium is one particular additive material, and may be utilized in the form of $V_2O_5$. As also noted above, carbon, particularly carbon generated during the reductive synthesis, can have a beneficial effect on the formation of the materials of the present invention. Hence, small amounts of organic material may be added to the reaction mixture, either directly or as artifacts of the preparation process. This reaction mixture is heated, at atmospheric pressure, under a reducing atmosphere as noted above, to a temperature of approximately 550-600° C. for 1.5-2.0 hours. Following the reduction, the material is cooled to room temperature, typically under an inert atmosphere. Material thus produced demonstrates excellent performance characteristics when incorporated into cathodes for lithium batteries.

In one specific procedure, a first material was prepared from a starting mixture comprising: $Li_2CO_3$, 0.02 M (1.4780 g) and $FePO_4 \times 2H_2O$, 0.04 M (7.0031 g with Fe content of 31.9%). A second material was prepared from a mixture comprising: $Li_2CO_3$, 0.02 M (1.4780 g); $FePO_1 \times 2H_2O$, 0.95×0.04 M (6.6530 g with Fe content of 31.9%) and $V_2O_5$, 0.05×0.02 M (0.1819 g). The mixtures were each ball milled for 96 hours in acetone with 2 mm and 5 mm YSZ balls. The acetone slurry was discharged from the bottle and dried in air. The powders were then ground with a mortar and pestle and transferred to quartz boats for a temperature programmed reduction reaction.

In the reaction, the mixtures were heated under a hydrogen atmosphere, at a flow rate of 1.26/min., according to the following schedule: RT→350° C., 2 hrs.; 350° C.→350° C., 2 hrs.; 350° C.→600° C., 3 hrs.; 600° C.→600° C., 1.5 hrs. Thereafter, the samples were cooled to 100° C. and passivated in an $O_2$/He atmosphere.

In the vanadium-free sample, particles ranged in size from 50 nm to several microns, and the micron sized particles had nanometer sized features. EDX analysis of two 200 nm sized particles showed an atomic percent ratio of Fe:P:O of 29.4:28:42.6 and 25.8:28.5:45.7, indicating the presence of phosphate and partially reduced phosphate. EDX analysis of a micron sized whisker structure showed an atomic percent ratio for Fe:P:O of 49.1:48.9:2.0 indicating the presence of FeP. EDX of one spot on a micron sized whisker showed Na peaks with an atomic percent of 11.6. All other EDX on different spots showed an Fe:P ratio of around 1 with an atomic percent of 0 of 1.6 to 49.5 indicating the presence of phosphate, partially reduced phosphate and FeP, but there was no indication of $Fe_2P$ or $Fe_3P$.

Similar analyses of the V containing material showed particle sizes ranging from 50 nm to several microns with nanometer sized features on the micron sized particles. EDX of one 150 nm particle showed Fe:P:O:V atomic percent ratios of 2.68:25.1:47.2:1.0 indicating the presence of phosphate and partially reduced phosphate. EDX of a 30 nm particle showed a Fe:P:O:V atomic percent ratio of 59.4:33.9:3.9:2.9 indicating the formation of $Fe_2P$ with the presence of V. EDX of a 150 nm long whisker showed a Fe:P:O:V atomic percent ratio of 68.8:30.5:0.6:0.1 indicating the formation of $Fe_2P$ and $Fe_3P$ without the presence of V. EDX of three different sized whiskers showed the presence of $Fe_2P$. EDX of round particles showed no difference in phosphate formation in the bulk and at edges. The x-ray diffraction pattern of $LiFePO_4$ indicates the olivine crystal structure.

Electronic and ionic conductivities were measured for a series of materials prepared in accord with the present invention as well as for a comparative series of materials. Table 1 hereinbelow sets forth representative measurements of these properties. Sample 1 in the table comprises a lithium iron phosphate material which did not include any additive of the present invention, and which was prepared in accord with prior art non-reductive synthetic procedures. Conductivity was measured using probe impedance spectroscopy on dry pellets of the materials, although other methods of measuring conductivity such as a galvanostatic intermittent titration method (GIPT) could be employed. Sample 2 comprises a lithium iron phosphate material which further includes vanadium but which was prepared utilizing a non-reductive process as per sample 1. Sample 3 is a lithium iron phosphate material which does not include any vanadium additive but which was prepared utilizing a reductive synthesis in accord with the present invention, and as such the material of sample 3 corresponds to the first synthesized material described above. Sample 4 corresponds to the second synthesized material described above and as such includes vanadium and has been prepared utilizing a reductive synthesis. Sample 5 is representative of a commercially available high rate capacity material comprising lithium cobalt oxide.

TABLE 1

| Sample No. | Sample Content | Precursors | Electronic Conductivity (S/cm) | Ionic Conductivity (S/cm) |
|---|---|---|---|---|
| 1 | $LiFePO_4$ without V | Fe (II) | $<7 \times 10^{-7}$ | $7 \times 10^{-5}$ |
| 2 | $LiFePO_4$ with V | Fe (II) | $4 \times 10^{-9}$ | $5 \times 10^{-5}$ |
| 3 | $LiFePO_4$ without V | Fe (III) | $7 \times 10^{-3}$ | $<7 \times 10^{-5}$ |
| 4 | $LiFePO_4$ with V | Fe (III) | $1 \times 10^{-4}$ | $5 \times 10^{-4}$ |
| 5 | $LiCoO_2$ | from FMC | $5.4 \times 10^{-4}$ | $1 \times 10^{-4}$ |

Samples 3 and 4 of the foregoing table were fabricated into electrodes and incorporated into half cells and evaluated in terms of their rate capability. The electrolyte utilized was 1 M $LiPF_6$ in 1:1 EC/DEC. The half cells were cycled at current densities of 13 mA/g, 60 mA/g, 250 mA/g and 800 mA/g for two, five, five and ten cycles. The results of this evaluation are summarized in graphic form in FIG. 1. Sample 3 and sample 4 have similar electronic conductivities, while the ionic conductivity of sample 4 is seven times higher than that of sample 3. As will be seen from the figure, charge capacity of sample 3 is relatively low compared to that of sample 4, even though its electronic conductivity is slightly better. This is particularly notable at high current densities. The charge capacity of sample 4 is significantly improved, and this is attributable not only to its good electronic conductivity but also to its improved ionic conductivity.

From the foregoing, it will be seen that the principles of the present invention provide for materials having significantly improved lithium ion conductivities. These materials can be utilized to fabricate electrodes for lithium and lithium-ion batteries which batteries will manifest very good rate capabilities.

The foregoing description has primarily been directed to iron-containing materials; however, it is to be understood that composite materials based upon other metals may likewise be fabricated in accord with the principles of the present invention. While the foregoing has generally described two-phase materials, the present invention may be employed to prepare single phase materials as well as materials comprising more than two phases. Also, the material of the present invention has been described with primary reference to its use as a cathode material for lithium batteries. It is to be understood that this material, owing to its good electronic and ionic properties, will also have utility in other electrochemical applications, such as chemical reactors, other battery systems, electronic devices and the like. Also, the material of the present invention will have utility in various catalytic applications both as an electrocatalyst and a non-electrocatalyst. Accordingly, it is to be understood that the foregoing description and discussion is illustrative of specific embodiments of the invention, but is not meant to be a limitation upon the practice thereof. It is the following claims, including all equivalents, which define the scope of the invention.

What is claimed:

1. A method for synthesizing an electroactive material, the method comprising:
providing a starting mixture which includes lithium, a metal M substantially all of which is in a first oxidation state, a phosphate ion, and an additive comprising one or more of V, Mo and Nb, wherein the additive enhances the transport of lithium ions in a material prepared by this method, as compared to a material prepared in the absence of the additive; and
heating the mixture in a reducing environment to produce an electroactive material comprising lithiated olivine metal phosphate, wherein substantially all of the metal M is in a second oxidation state which is lower than the first oxidation state.

2. The method of claim 1, wherein the electroactive material comprises a single phase.

3. The method of claim 1, wherein the electroactive material comprises more than two phases.

4. The method of claim 1, wherein the electroactive material comprises:
a first phase comprising a lithiated olivine metal phosphate comprising the metal M;
a second phase having an ionic conductivity greater than the ionic conductivity of the first phase; and
the additive in at least one of the first and second phases;
characterized in that when incorporated into a cathode of a lithium battery, the electroactive material has a lithium ion conductivity in the range of $10^{-6}$ S/cm to $5 \times 10^{-4}$ S/cm.

5. The method of claim 1, wherein the additive substitutes for at least a portion of the phosphorous in the material.

6. The method of claim 5, wherein at least some of the phosphate groups having the additive substituted therein are reduced.

7. The method of claim 1, wherein the additive substitutes for a portion of the metal M in the material.

8. The method of claim 1, wherein the additive is operative to modify the lattice structure of the material, whereby the transport of lithium ions through the modified lattice is enhanced in relation to the transport of lithium ions through the corresponding unmodified lattice.

9. The method of claim 1, wherein M is Fe.

10. The method of claim 9, wherein substantially all of the iron in the starting mixture is in the form of the $Fe^{+3}$ ion.

11. The method of claim 9, wherein the iron and the phosphate ion in the starting mixture are provided in the form of ferric phosphate.

12. The method of claim 1, further comprising the step of grinding the mixture prior to heating the mixture in the reducing environment.

13. The method of claim 1, wherein the step of heating the mixture comprises heating the mixture to a temperature in the range of 300-750° C.

14. The method of claim 1, wherein the step of heating the mixture comprises heating the mixture to approximately 650-700° C.

15. The method of claim 1, wherein the additive is a nucleating agent which promotes the growth of at least one component of the material.

16. An electroactive material made according to claim 1.

17. The electroactive material of claim 16, characterized in that when incorporated into a cathode of a lithium ion battery, the electronic conductivity of the material is in the range of $10^{-7}$ S/cm to $10^{-4}$ S/cm.

18. An electrode which includes the electroactive material of claim 16.

19. A method for synthesizing an electroactive material, the method comprising:
providing a starting mixture which includes lithium, a metal M substantially all of which is in a first oxidation state, a phosphate ion, and an additive comprising one or more metals having a +5 oxidation state, but not a +6 oxidation state, wherein the additive enhances the transport of lithium ions in a material prepared by this method, as compared to a material prepared in the absence of the additive; and
heating the mixture in a reducing environment to produce an electroactive material comprising lithiated olivine metal phosphate, wherein substantially all of the metal M is in a second oxidation state which is lower than the first oxidation state.

* * * * *